Figure 1:
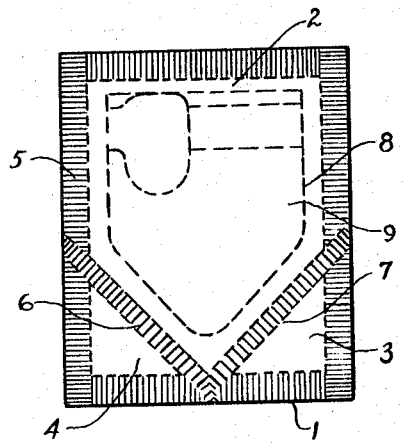

Oct. 18, 1966  F. AGUIRRE-BATRES  3,279,926
INDIVIDUAL COFFEE EXTRACTOR
Filed Dec. 6, 1963

INVENTOR.
FRANCISCO AGUIRRE-BATRES
BY
ATTORNEY

United States Patent Office 3,279,926
Patented Oct. 18, 1966

3,279,926
INDIVIDUAL COFFEE EXTRACTOR
Francisco Aguirre-Batres, Guatemala, Guatemala, assignor to Instituto Centroamericano de Investigacion y Tecnologia Industrial, Guatemala, Guatemala, a corporation of Guatemala
Filed Dec. 6, 1963, Ser. No. 328,607
1 Claim. (Cl. 99—77.1)

This invention relates to a device for the preparation of hot drinks, in particular, to a device for the preparation of hot coffee or tea.

For the preparation of the well-known drink "hot coffee," the procedure followed is to use any commercially available ground roasted coffee and to extract it with hot water by any conventional device like percolator, etc.

Due to the inconvenience of preparing the drink in the above mentioned fashion which involves time and certain amount of observation, I have devised a new method of preparing hot coffee instantaneously. The process of preparing soluble coffee is one well-known, and large industrial installations produce the instant coffee powder, which upon mixture with hot water, yields a beverage, that is said to resemble in characteristics the original coffee. While this soluble coffee is convenient and practical and prepared from any of the commercial brands, it is evident that the flavor and aroma of an original freshly brewed coffee is practically lost.

The object of this invention is to provide a device to conveniently and rapidly prepare a hot coffee with the original flavor by directly extracting the roasted ground coffee with hot water. The method can also be applied to any other dry product which should yield from the ground product a liquid extract or aqueous infusion.

It is further the object of this invention to provide a marketable device for extracting any vegetable matter as above, a device which is so designed as to serve simultaneously as the package of the extractable vegetable matter. This device is suitable for mass production and direct retailing of the extractable vegetable matter so that it will yield rapidly a liquid infusion which contains all the flavor of the original product.

Furthermore, the object of this invention is to provide a suitable package-device for extracting vegetable matter as above, with internal compartments to contain sugar and/or powdered cream for the preparation of any hot drink which usually is used with either sugar or any other conventional additive, like spices, etc.

This invention, accordingly, consists of an outer, non-permeable envelope, suitable for vacuum sealing and an inner envelope comprising a porous bag with a mouth fitted with a device to hold said porous bag, and the inner porous bag containing the extractable vegetable matter.

When it is desired to prepare a cup of coffee, the outersealed envelope is broken, the porous inner container is taken out and the mouth is spread open with one hand, while holding it with the other hand by a form of handle or hook provided. Hot water is poured through the mouth of the bag containing the porous coffee grounds and the fresh extract is received in a cup placed beneath it for collection.

Figure 2:
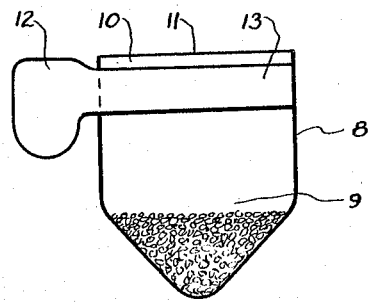

To understand the present invention better, FIGURE 1 depicts one of the possible embodiments thereof, while FIGURE 2 presents the way in which the package-device is used.

Figure 3:
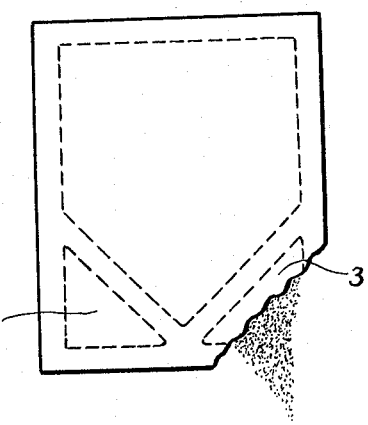
Figure 4:
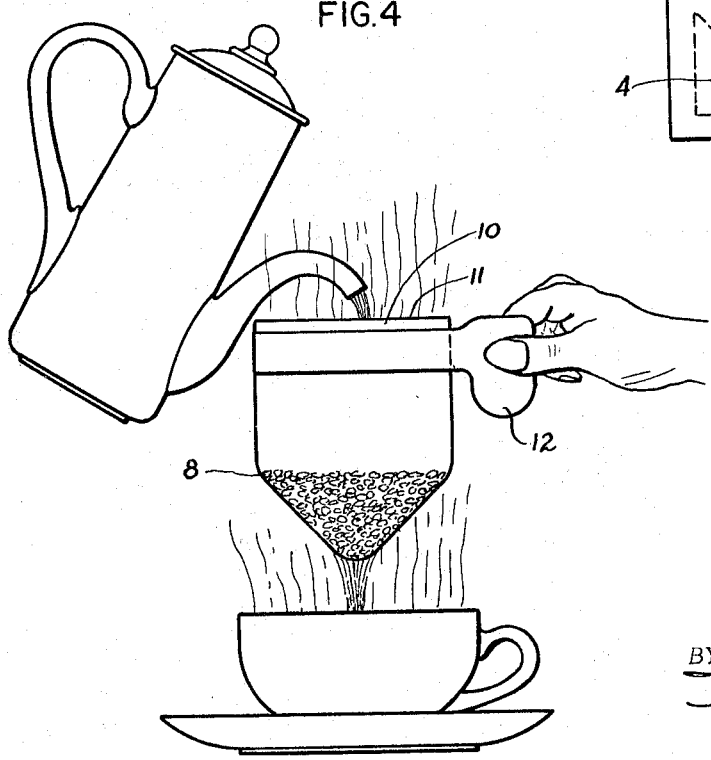

In the drawings:
FIGURE 1 is a plan view of the device;
FIGURE 2 is a plan view of the device lifted from its container;
FIGURE 3 is a plan view illustrating the partial opening of a compartment;
FIGURE 4 is an illustration of the use of the device in making a beverage.

In reference to FIGURE 1, the view is a schematic one where 1 is the outer envelope comprising three compartments 2, 3, 4 separated and surrounded by sealed areas 5, 6, 7 thereof. The largest compartment 2 contains an inner porous bag 8, which contains the coffee grounds 9; FIGURE 2 shows the porous bag 8 containing the coffee grounds 9, with an upper light seal 10, to keep the coffee grounds 9 from spilling out of the inner container 8, said seal 10 being suitable for quick easy opening to form a mouth 11 while the whole inner bag 8 is held by the holder 12 with the stiff rim 13.

FIGURE 3 shows the way in which the smaller sealed compartment 3, 4 can be opened to pour out sugar and/or milk etc., if so desired.

FIGURE 4 shows the way of preparing the individual coffee once the upper seal 10 has been broken, and the mouth 11 has been formed by spreading the sides apart while holding the inner bag 8, by the holder 12, hot water is poured in such a way as to maintain the hot water level to cover the ground matter. The rate of flow of the extract into the cup and therefore the length of time of the extracting water in the inner bag 8 in contact with the coffee grind 9, can be regulated by selecting a material of adequate porosity. Once the necessary amount of coffee extract has percolated, the porous bag and is contents can be discarded. Sugar with or without dried milk can be added from the other compartments of the outer envelope or from other sources.

It is to be understood that while only one particular embodiment of the invention is presented here, many others can be presented. In particular, the outer sealed bag and the inner porous bag can be incorporated into a composite bag in such a manner that by ripping one side open, an integral porous part of the composite bag can be unfolded, and by ripping the other side, a mouth can be formed to pour the hot water into the coffee grind therein.

Reference to FIGURE 1 illustrates this point. Severance of the top of container 1 will serve to provide a mouth for adding hot water. Severance across the bottom, at a level to intercept sealed areas 6 and 7 will provide an outlet. In this form, the envelope itself can serve as the handle 12 and support for a filter paper bag 8.

It is apparent that in the manufacture of blanks for the preparation of a device of this kind, two sheets of metal foil (preferably aluminum) matched and subjected to sealing at spaced areas corresponding to 5 will provide a basis for being loaded with the proper cups or containers (made of cloth or filter paper) corresponding to 8. Thus, the individually filled paper cups of coffee grounds shown in 8, having the tops closed can be placed in the base container 1 and sealed automatically, to be formed in strips of very large numbers. It is apparent that in using a trapezoidal space, and tearing the top open along one line and the bottom along a line high enough to permit the aqueous infusion to be discharged, a useful device is had. Thereafter, merely passing hot water through the upper opening, through the grounds and then out through the container will produce the aqueous infusion of beverage sought by the consumer.

Materials of construction are metal foil for envelope 1 and common chemical filter paper for container 8. The metal foil is preferably aluminum and, to make it readily available, it may have juxtaposed faces coated with plastic, such as polyethylene. Handle 12 of the porous container may be of wire or a stiff water-resistant paper. Plural folds of filter paper will serve also. It is evident that it can be grasped with the edge 5 of the metal foil to provide an adequate handle for the whole combination.

There is no intention either to limit the scope of this invention to the use of coffee grounds; for the better understanding of the subject matter, any suitable vegetable material may be extracted instead.

What is claimed is:

A disposable device for the extraction of the soluble portions of coffee and tea, suitable for the preparation of aqueous infusions thereof in a cup as needed by a user, which comprises an outer sealed water impervious envelope, an inner container entirely enclosed therein with at least a water permeable bottom section therein, an upper section of said inner container being lightly sealed to form a mouth when open, said inner container holding a portion for extraction whereby upon removing the inner container from the outer container said inner container can be held over a cup and an aqueous infusion formed by pouring water therein and allowing the water to percolate through the material, the inner container being further equipped with a separate holder around the open upper section suitable to support said device and to provide a handle for holding it while making said infusion.

References Cited by the Examiner

UNITED STATES PATENTS

| | | | |
|---|---|---|---|
| 634,349 | 10/1899 | Humphrey | 99—77.1 |
| 759,029 | 5/1904 | Shea. | |
| 988,453 | 4/1911 | Forney. | |
| 1,931,765 | 10/1933 | Leever | 99—77.1 |
| 2,791,324 | 5/1957 | Knoop et al. | 206—47 |
| 2,805,164 | 9/1957 | Doppler | 99—77.1 X |
| 2,822,273 | 2/1958 | Anderson | 206 X |
| 3,102,465 | 9/1963 | Montesano | 206 X |

LOUIS G. MANCENE, *Primary Examiner.*

THERON E. CONDON, *Examiner.*

MARTHA L. RICE, *Assistant Examiner.*